Feb. 14, 1933.    G. P. BERRY    1,897,787
BRAKE ACTUATING MECHANISM
Filed March 19, 1928
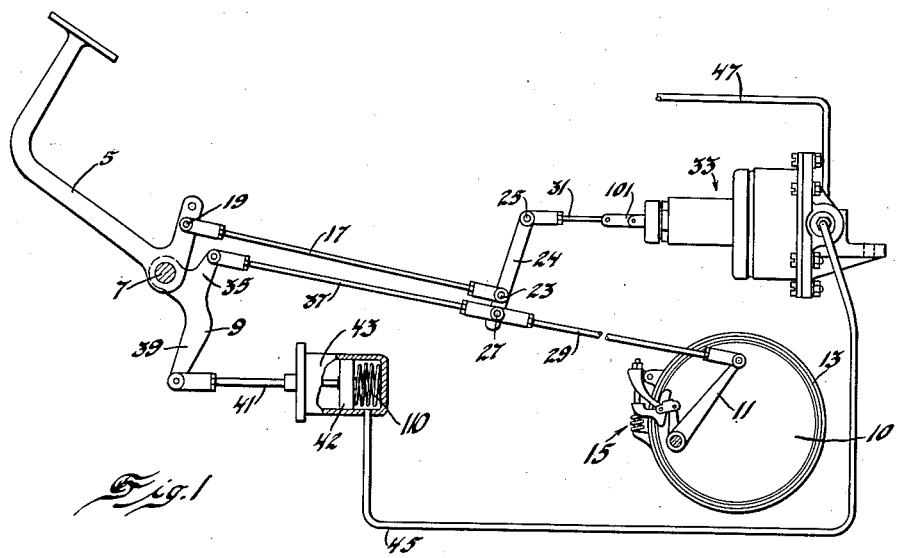
Fig. 1
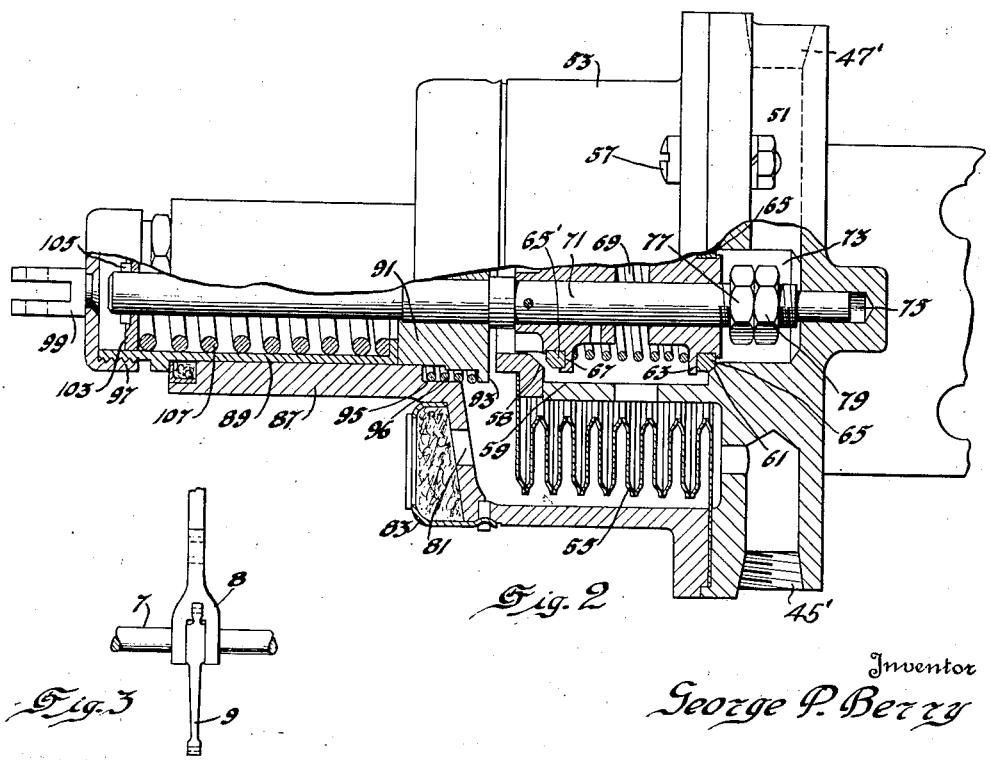
Fig. 2
Fig. 3
Inventor
George P. Berry
By Blackmore, Spencer & Huth
Attorneys Patented Feb. 14, 1933

1,897,787

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

BRAKE ACTUATING MECHANISM

Application filed March 19, 1928. Serial No. 262,823.

This invention relates to brakes and is intended particularly as an improvement for use with brakes on motor vehicles.

The invention is concerned specifically with a brake arrangement wherein the effort manually applied is divided, one part acting directly on the brake through the mechanical linkage and the other part operating a valve which functions to control a power cylinder associated with a fluid pressure brake applying mechanism. Such systems are known and in general such power brake mechanism includes a cylinder, a piston of which is connected by mechanical linkage with the brake, and the cylinder is connected by a conduit to the engine manifold, the manually controlled valve being located in the conduit.

The object of this invention is to improve the valve element in such a system. Another object is to improve the connections by which the several parts are associated together. A further object is to improve upon prior known systems by an arrangement wherein no reaction is imparted to the valve plunger from the power cylinder. Other objects and advantages will be apparent and understood from the following description and from an examination of the accompanying drawing.

In the drawing:

Figure 1 is a diagrammatic view of the several parts comprising the brake operating mechanism.

Figure 2 is a view in elevation, partly in section, of the novel control valve.

Figure 3 is a view of a detail.

Referring by reference characters to the drawing, numeral 5 is applied to a pedal such as is commonly used on motor vehicles to apply the brakes through the instrumentality of mechanical linkage. The pedal on its pivot pin 7 is forked as at 8. This forked fulcrum part of the pedal 5 straddles the fulcrum of a two-arm lever 9, the lever 9 being rotatably mounted on the same pivot axis as the pedal. Numeral 10 represents the brake. No novelty is herein claimed for any particular brake structure per se. The brakes to be applied by the pedal may be of any kind preferred. For the purpose of illustration, the brake 10 is used to represent any kind of braking instrumentality to which the applied force is transmitted. As shown, the brake has an arm 11 movable to apply a band 13 through the intermediate connecting linkage 15. For transmitting the pedal pressure, a rod 17 is connected to the pedal at 19. Rod 17 is connected to an intermediate point 23 of what may be called a ratio arm 24. The connection is near one end of the ratio arm so that the pull upon this arm may be transmitted as a relatively small force at one end 25 and as a relatively large force at the opposite end 27. The end 27 of the ratio arm adjacent the point 23 is connected by rod 29 with the brake actuating arm 11, or with some mechanical part connected to the brakes of the vehicle. The longer part of the ratio arm 24 is connected at 25 to a link 31, itself connected to a valve designated as an entirety by numeral 33. By the means described, a given mechanical effort applied to the pedal is divided into two parts, a relatively large force applied by mechanical linkage directly to the brake and a relatively small force applied to operate the valve 33. One arm 35 of lever 9 is connected by a link 37 with the ratio arm at its end 27, the rod members 37 and 29 being substantially in alignment. The other end 39 of lever 9 is connected by link 41 to the power brake applying mechanism. Specifically, and in a well-known way, the rod 41 is connected to a piston 42 within cylinder 43.

Cylinder 43 on the side of piston 42 remote from the rod 41 is connected by a conduit 45 to an opening 45' in the valve 33. A conduit 47 connects the valve opening 47' to a source of sub-atmospheric pressure, as to the manifold of the internal combustion engine carried by the vehicle. The valve 33 functions to open and close a passage between conduits 47 and 45 whereby the suction of the motor may be effective upon one side of piston 42 within its cylinder 43, normal atmospheric pressure being available upon the other side of the piston. It will be understood that when the motor suction draws air from one side of the piston, the atmospheric pressure on the other side causes the piston to move and its linkage to apply the brakes.

Referring to Figure 2, the improved valve may consist of a supporting part 51 designed for attachment to a vehicle frame, said support and the valve housing proper 53 constituting the valve member. The end of sylphon bellows 55 is clamped between the parts of the valve 51 and 53, there being suitable fastening means 57. At its other end, the bellows carries a valve seat 58 movable to and fro in the operation of the valve. The supporting member 51 has an inner chamber formed by a tubular extension 59 against the outer end of which the valve seat 58 may rest when in release position. Within the chamber 59 adjacent the inner end part 51 is formed with a valve seat 61. Valve member 63 is located within the tubular part 59 and is provided with packing 65 engaging the valve seat 61. In alignment with valve 63 is a valve 67 having packing 65' engaging valve seat 58. Between the valves is a compression coil spring 69 seated on the hub portion of the two valves and tending to push each valve against its seat. Valves 63 and 67 are apertured in axial alignment, and extending through the apertures is a valve plunger rod 71. Valve 67 is secured to the plunger rod 71. Rod 71 projects into a somewhat smaller opening 73 in part 51 beyond the valve seat 61 and the extreme inner end of rod 71 is reduced in diameter and is guided for reciprocating movement in a relatively small opening 75 bored in part 51. Within the opening 73 the rod 71 is provided with a nut 77 and lock nut 79, the nut 77 serving as an abutment whereby the reciprocation of rod 71 may raise valve 63 from its seat 61. The opening 73 is connected with the pipe 47 communicating with the engine manifold, and the space within the tubular extension is connected with the conduit 45 communicating with the power cylinder 43. The space within the valve but outside the bellows is in communication with the outside air as, for example, by one or more openings 81. An apertured cap 83 may cover the valve member and a suitable air cleaning medium, such as dry wool or coarse hair may be positioned inside the cap. This air cleaning provision is, of course, to keep the dust and grit from the valve seats. The outer end of valve member 53 is somewhat reduced in diameter and elongated, as shown in the drawing by reference character 87. Slidable in said elongated part 87 is a tubular member 89. This tubular member has an inner solid head 91 formed with a flange 93. The reduced part 87 is recessed as at 95 and in said recess and engaging the flange 93 is a coil spring 96. This coil spring is constantly active to project inwardly the member 89. The head 91 of member 89 engages a shoulder on rod 71 and when moved inwardly under the influence of spring 96, the rod lifts the valve 67 from its seat. The outer end of member 89 is threaded to receive a terminal cap 97, the cap having a stem 99 for attachment to a link 101, which link 101 is also connected with the rod 31. The plunger rod 71 extends through member 89 being slidably engaged therewith at the head portion 91. At the outer end of rod 71 is a disk 103 secured by fastening means 105 and between said disk and the head 91 is a coil spring 107.

In some of the earlier experimental work performed in connection with this invention, the equivalent of spring 96 was placed outside the valve and the equivalent of rod 71 was directly connected to the equivalent of the ratio arm 24. The present arrangement has been found to be a distinct improvement and to overcome certain disadvantages of the earlier arrangement. With the direct coupling between the ratio arm and the valve plunger, there was a tendency of the latter to bind due to a side pull on the plunger by the ratio arm. By providing the member 89 movable axially relative to the rod 71 and under the influence of spring 107, this tendency to bind has been avoided. The spring 107 serves to provide a flexible connection to counteract the binding of the valve plunger and also to permit the point 25 of the ratio arm to move bodily. In thus providing for bodily movement of point 25 without a necessary corresponding movement of the valve members, there is little tendency for the ratio arm 24 to swing about this point 25 as an axis. The coupling spring 107 is designed to have such strength as to permit the ratio arm to move bodily approximately in its same position of angularity with the brake rod. In so doing, the ratio secured by the use of the ratio arm does not vary appreciably. In making a change from the earlier arrangement, as stated above, it was found that the provision for the housing spring 107 made it necessary that member 89 should be of rather large diameter. This somewhat large size of the sliding member 89 assists in preventing any binding action in the valve.

The operation of the valve may be briefly stated. As pressure is given the pedal, a part of that pressure is transmitted through the ratio link 24 and pulls upon sleeve member 89, spring 107 and through the spring upon the plunger rod 71. With the parts in their relative position, as shown in Figure 2, atmospheric air may enter through openings 81 and pass the valve 67 and enter the chamber 59. Under the influence of spring 96 the plunger is held inwardly and spring 69 seats the valve 63, valve 67 being held from its seat in an obvious manner. As the rod 71 is moved outwardly, it carries valve 67, which is secured thereto, to its seat 58. A further movement of plunger rod 71 lifts valve seat 58, expands the bellows 55 and by means of the nuts 77 and 79 raises valve 63 off its seat 61. The engine suction is then effective to draw air away from one side of piston 42 in cylinder 43 and the air pressure on the other side moves piston 43 and thereby pulls upon rod 41, rotates lever 9, and pulls upon links 37 and 29 to apply the brake. This action of applying the brake is accomplished by a fractional part of the pedal pressure, the major part of the pedal pressure acts directly upon the brake through linkage 17 and 29. As the extent of suction in the valve chamber increases, air pressure on the outside of the bellows tends to collapse the same pressing upon valve seat 58 and valve 67 and the sliding plunger rod 71. This closing tendency of the valve 63 under the influence of engine suction is nevertheless resisted by the pull on rod 71 from the pedal through the ratio arm 24. Therefore, the valve 63 cannot close until the vacuum pressure has increased in the bellows sufficiently to balance the pull exerted by the pedal. For this reason, with a varying pressure on the pedal a varying and proportionate vacuum pressure is built up in the brake valve and the brake cylinder. Should the pedal pressure be lessened during braking operation, the valve 67 is forced open by spring 96, air being admitted through the valve to the chamber 59 and to the cylinder 43, thereby reducing the braking effort until a new balance is established. Upon a complete release, spring 96 holds the valve 67 open and air is admitted. The valve is of the reaction type by which is meant that the valve reacts upon the pedal indicating by the pressure it exerts against the foot of the operator on the pedal a measure of the work being done by the power cylinder. This reaction is effective through the ratio arm by which the reaction of the valve to varying vacuum pressures is transmitted to the brake pedal, giving a "feel" which is commensurate with the effort of the power cylinder in applying the brake. It is obvious that complete control of the vacuum cycle of the braking operation may be had from this ratio arm. For example, should the ratio of pull exerted upon the control valve be made small in comparison with that transmitted directly to the brakes, the time of operation of the vacuum system before full vacuum is reached, could be extended through the full period of manual operation. Under these conditions, aid in braking would be obtained from the vacuum system at all pedal pressures up to that required for maximum deceleration. Should this ratio be made larger, maximum aid would be obtained from the vacuum system at a lower pedal pressure, the driver supplying the additional pressure required for maximum deceleration through the manual system alone.

In certain early experimental work, the power cylinder was made to operate the brake in much the same way as has been described. In these earlier experiments, the equivalent of rod 41 was connected to the pedal itself so that the power action of the brake acted like an involuntary added pressure given the pedal. This added pressure operable through the pedal functioned like any pedal pressure and was divided, the greater part acting directly on the brake but a predetermined part functioning to open the valve, causing an unexpected and often undesirable additional brake force to be applied. It was found that as the vacuum pressure increased in the brake cylinder the reaction on the valve plunger became larger tending to allow maximum pressure to build up in the cylinder before it could be checked by the control valve. Again, on release of the brakes, the removal of the foot from the pedal released the reaction on the valve plunger from that source, but there still remained a partial vacuum in the cylinder due to the reaction on the valve from the cylinder itself. Under these conditions, the brakes could not release properly. It is therefore regarded as very important that the control valve be acted upon and be controlled only by pressure of the foot on the brake pedal. By the use of the lever 9, this difficulty is entirely avoided. There is no such reaction through the linkage and ratio arm to open the valve by the brake pull effected by the power cylinder and acting through lever 9 and links 37 and 29. Also, the lever 9 affords an opportunity for giving the power cylinder any desired leverage by properly dimensioning its arms. This makes possible the use of a cylinder of smaller diameter. Such smaller diameter need only be associated with greater length in order to take care of the accompanying greater stroke. The great advantage of lever 9 is, however, the avoidance of the reaction which had heretofore been imparted to the valve through the connections with the pedal.

Within the power cylinder there is preferably a spring 110 which serves the purpose of a pedal release spring in insuring the return of the pedal after removal of the foot. In the earlier experiments, a tendency of the pedal to lag was observed, owing perhaps to the inertia of the piston 42 in its cylinder. The location of the spring in the cylinder itself is desirable in that it is housed from view and because the foot does not have to overcome the spring pressure in applying the brake. This is done by the suction in the cylinder.

The two more striking characteristics of this invention are the use of the lever 9 and the flexible connection between the ratio arm and the valve plunger. By the second of these novel features a smooth acting valve is obtained. Also, the valve may close without positive pedal movement. Any tendency of the ratio arm to pivot about its connection with the valve plunger is avoided. By the former expedient, variable leverage may be had. Smaller power cylinders may be used. Most important of all, no reaction is possible from the power cylinder upon the valve, the control valve being acted upon and controlled only by the pressure of the foot on the brake pedal.

I claim:

1. In combination, a pedal, a fulcrum therefor, a pivoted double arm lever mounted on said fulcrum, a ratio arm, links between said ratio arm and said pedal and an arm of said lever respectively, a power cylinder, a link connection between said power cylinder and the second arm of said lever, a link between said ratio arm and said brake, a reaction valve for controlling the power cylinder and a rod connecting said valve and said ratio arm, whereby the valve causes a proportional reaction through the ratio arm on the pedal.

2. The invention defined by claim 1, said valve having a plunger and a yielding connection betwen said plunger and said rod connection between the ratio arm and valve.

3. In combination, a brake, a pedal, a connection therebetween including links terminally secured to the pedal and to brake operating means, a ratio arm attached at spaced points to adjacent ends of said links, a fluid operated mechanism for actuating said brake including a power cylinder, means including a reaction valve to convey fluid to said cylinder, a pivoted rocker having arms, said rocker being independent of the connection between the pedal and brake, link connections between arms of said rocker and said power cylinder and said ratio arm, the link connection with the ratio arm being in alignment with that one of the first mentioned links which is connected to the brake operating means, and means connecting said valve to said ratio arm.

In testimony whereof I affix my signature.

GEORGE P. BERRY.